United States Patent
Dotson et al.

(10) Patent No.: US 10,831,646 B2
(45) Date of Patent: Nov. 10, 2020

(54) RESOURCES USAGE FOR FUZZ TESTING APPLICATIONS

(71) Applicant: International Business Machines Corporation, Armonk, NY (US)

(72) Inventors: Christopher R. Dotson, Lexington, KY (US); Charles S. Lingafelt, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 121 days.

(21) Appl. No.: 16/238,297

(22) Filed: Jan. 2, 2019

(65) Prior Publication Data

US 2020/0210326 A1 Jul. 2, 2020

(51) Int. Cl.
  *G06F 11/36* (2006.01)
  *G06F 11/07* (2006.01)
  *G06F 21/57* (2013.01)

(52) U.S. Cl.
  CPC ...... *G06F 11/3688* (2013.01); *G06F 11/0751* (2013.01); *G06F 11/0793* (2013.01); *G06F 11/3684* (2013.01); *G06F 21/577* (2013.01); *G06F 2221/033* (2013.01)

(58) Field of Classification Search
  CPC ............ G06F 11/3688; G06F 11/0751; G06F 11/0793; G06F 11/3684; G06F 21/577; G06F 2221/033
  See application file for complete search history.

(56) References Cited

U.S. PATENT DOCUMENTS

| 7,827,486 B2* | 11/2010 | Mayer-Ullmann ..... G06F 9/451 715/704 |
| 8,336,102 B2 | 12/2012 | Neystadt et al. |
| 8,417,993 B2 | 4/2013 | O'Leary |
| 8,417,998 B2 | 4/2013 | Thomas et al. |
| 8,819,834 B2 | 8/2014 | Petrica et al. |
| 9,146,829 B1 | 9/2015 | Allen |
| 9,164,870 B2 | 10/2015 | Qiu et al. |
| 9,432,394 B1* | 8/2016 | Lahiri ................... G06F 21/577 |
| 9,910,766 B2 | 3/2018 | Cecchetti et al. |

(Continued)

FOREIGN PATENT DOCUMENTS

| WO | 2014049104 A1 | 4/2014 |
| WO | 2014082908 A1 | 6/2014 |

OTHER PUBLICATIONS

Fuzzing. Retrieved on Jun. 22, 2020. Wikipedia. Retrieved from the Internet: <URL: https://en.wikipedia.org/wiki/Fuzzing>.*

(Continued)

*Primary Examiner* — Paul Contino
(74) *Attorney, Agent, or Firm* — Yee & Associates, P.C.

(57) ABSTRACT

Improved utilization of spare resources for fuzz testing is provided. A production environment that includes a plurality of running applications having a plurality of user input fields is monitored over a period of time for consumer use. Actual usage data for the plurality of user input fields are determined during the period of time. Each user input field in the plurality of user input fields is ranked for fuzz testing based on, at least in part, the actual usage data corresponding to each respective user input field during the period of time. The fuzz testing is selectively performed on a portion of the plurality of user input fields based on user input field rankings.

25 Claims, 7 Drawing Sheets

(56) References Cited

U.S. PATENT DOCUMENTS

| | | | |
|---|---|---|---|
| 9,917,924 | B2 | 3/2018 | Mandal |
| 2007/0203973 | A1 | 8/2007 | Landauer et al. |
| 2010/0058475 | A1 | 3/2010 | Thummalapenta et al. |
| 2010/0281460 | A1 | 11/2010 | Tillmann et al. |
| 2011/0131479 | A1* | 6/2011 | Padgett ................. G06F 3/0481 715/223 |
| 2015/0339019 | A1* | 11/2015 | Ledenev ............... G06F 3/0484 715/772 |
| 2019/0146900 | A1* | 5/2019 | Rose .................... G06F 21/577 717/124 |
| 2020/0034281 | A1* | 1/2020 | Hamid .................. G06N 20/00 |

OTHER PUBLICATIONS

Tsankov et al., "Semi-valid Input Coverage for Fuzz Testing," ISSTA'13, Jul. 15-20, 2013, Lugano, Switzerland, 11pp.

Patra et al., "Learning to Fuzz: Application-Independent Fuzz Testing with Probabilistic, Generative Models of Input Data," Nov. 21, 2016, Technical Report TUD-CS-2016-14664, TU Darmstadt, Department of Computer Science, Darmstadt, Germany, 15 pp.

Chen et al., "EnFuzz: From Ensemble Learning to Ensemble Fuzzing," Jun. 30, 2018, 10 pp., arXiv preprint, https://arxiv.org/abs/1807.00182.

Yan et al., "Structurized Grammar-Based Fuzz Testing for Programs with Highly Structured Inputs," Security Comm. Networks 2013, vol. 6, pp. 1319-1330.

distributed.net, accessed on Dec. 28, 2018, 8 pp., https://www.distributed.net/Main_Page.

GitHub.com, accessed on Dec. 28, 2018, 6 pp., https://github.com/orgcandman/Simple-Fuzzer.

kubernetes.io, accessed on Jan. 2, 2019, 26 pp., https://kubernetes.io/docs/concepts/services-networking/service/.

* cited by examiner

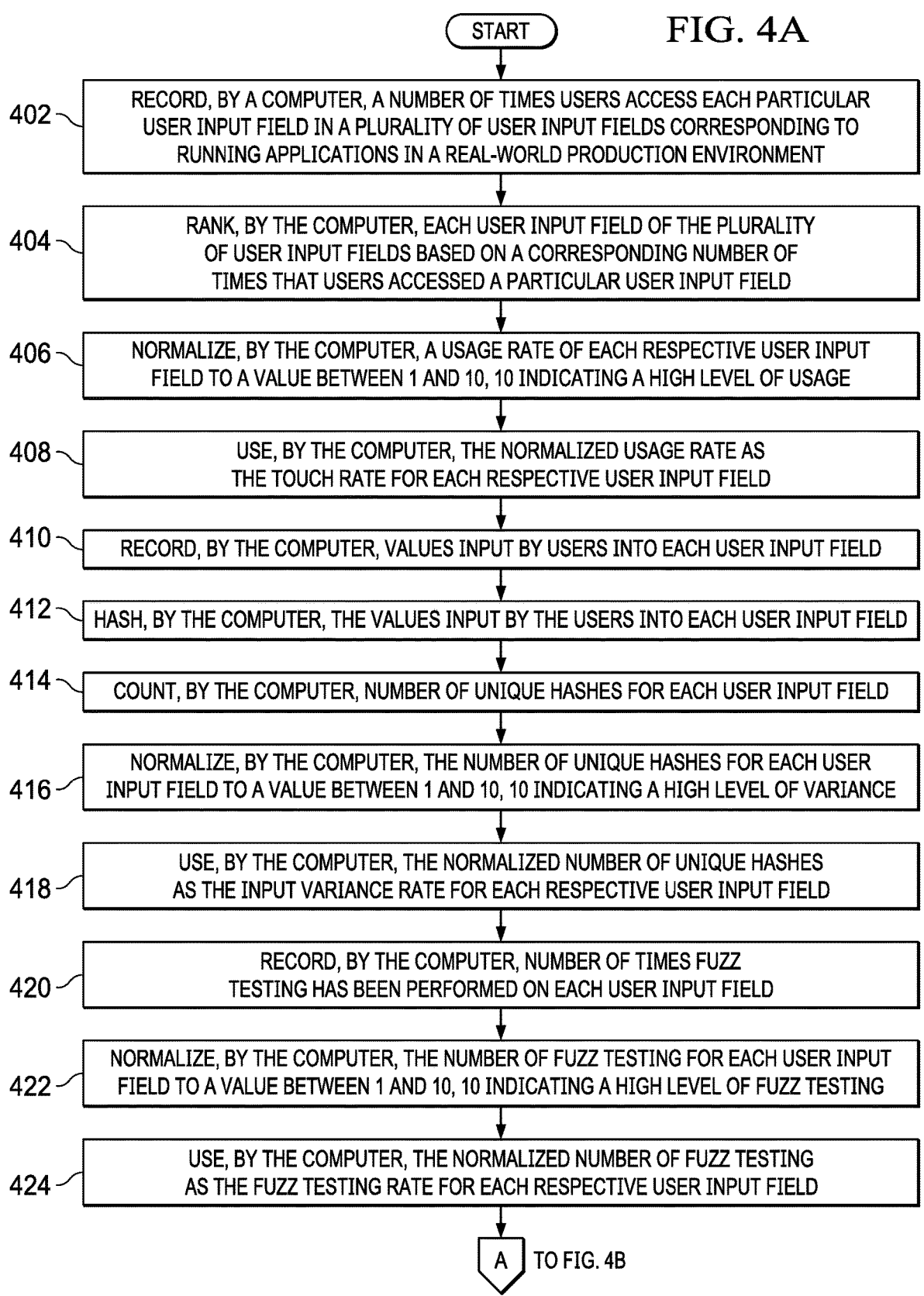

RESOURCES USAGE FOR FUZZ TESTING APPLICATIONS

BACKGROUND

1. Field

The disclosure relates generally to application fuzz testing and more specifically to effectively utilizing spare resources via workload and environment management when fuzz testing running applications in a real-world production environment based on rules, self-learning, and real user interactions with user input fields of the running applications.

2. Description of the Related Art

Fuzz testing or fuzzing is an automated software quality assurance testing technique that involves providing valid, semi-valid, unexpected, or random data, called fuzz, as input to an application under test to discover coding errors and security vulnerabilities. The application is monitored for exceptions, such as, for example, crashes, failing built-in code assertions, or potential memory leaks. Fuzz testing may be utilized to discover vulnerabilities that can be exploited by, for example, buffer overflow, denial of service, cross-site scripting, and Structured Query Language (SQL) injection schemes. These vulnerability exploitation schemes are typically used by malicious users or entities. If a vulnerability is found, a software tool called a fuzzer can be used to identify potential causes. Typically, fuzzers are used to test applications that take structured input. This input structure is specified in a file format, for example, and distinguishes valid from invalid input. An effective fuzzer generates inputs that are "valid enough" not to be rejected by the parser, but are "invalid enough" to create unexpected behaviors in the program and expose undetected issues.

For the purpose of security, fuzz testing input that crosses a trust boundary is often more important. For example, it is more important to perform fuzz testing on software code that handles the upload of a file by any user. Conversely, it is less important to perform fuzz testing on software code that parses a configuration file which is only accessible by a privileged user, such as a system administrator or security analyst. However, fuzz testing is time-consuming due to the large number of possibilities that need to be explored and the large number of combinations of valid input parameters. In addition, fuzz testing is difficult to automate because human intelligence is often needed to determine a valid starting point in an application for the fuzz testing.

SUMMARY

According to one illustrative embodiment, a computer-implemented method for improved utilization of spare resources for fuzz testing is provided. A computer monitors consumer use of a production environment that includes a plurality of running applications having a plurality of user input fields over a period of time. The computer determines actual usage data for the plurality of user input fields during the period of time. The computer ranks each user input field in the plurality of user input fields for fuzz testing based on, at least in part, the actual usage data corresponding to each respective user input field during the period of time. The computer selectively performs the fuzz testing on a portion of the plurality of user input fields based on user input field rankings. Thus, the computer saves fuzz testing resources (e.g., processor cycles, memory, and storage space) and increases performance of the computer by only fuzz testing specific user input fields providing an improvement over current fuzz testing solutions. According to other illustrative embodiments, a computer system and computer program product for improved utilization of spare resources for fuzz testing are provided.

The different illustrative embodiments also re-rank the plurality of user input fields for the fuzz testing on a predetermined time interval basis based on changes in consumer user input field usage patterns as represented by the actual usage data and prior fuzz testing rates. Thus, the different illustrative embodiments are able to dynamically adapt to changes in consumer usage patterns of user input fields that occur over time.

Further, the different illustrative embodiments select a running application from a ranked list of running applications in the production environment. Then, a clone of a current context of a consumer in the running application is instantiated. User input fields corresponding to a set of one or more possible vulnerabilities in the running application are selected. Fuzzed inputs are generated for the selected user input fields based on snapshots of real consumer inputs into the selected user input fields and current environmental context. A starting point for the fuzz testing on the running application is initialized in a generated test copy of the running application. The fuzz testing is performed at the starting point by inputting generated fuzzed inputs into selected user input fields of the generated test copy of the running application. It is determined whether the fuzz testing caused a failure to occur. In response to determining that the fuzz testing did cause a failure to occur, conditions of the failure are recorded. Also, a set of mitigation action steps is performed based on the conditions of the failure. Thus, the different illustrative embodiments are able to automatically fix detected issues or eliminate an ability to exploit a detected vulnerability.

BRIEF DESCRIPTION OF THE DRAWINGS

FIGS. 4A-4B are a flowchart illustrating a process for an evaluation phase in accordance with an illustrative embodiment;

DETAILED DESCRIPTION

Figure 1:
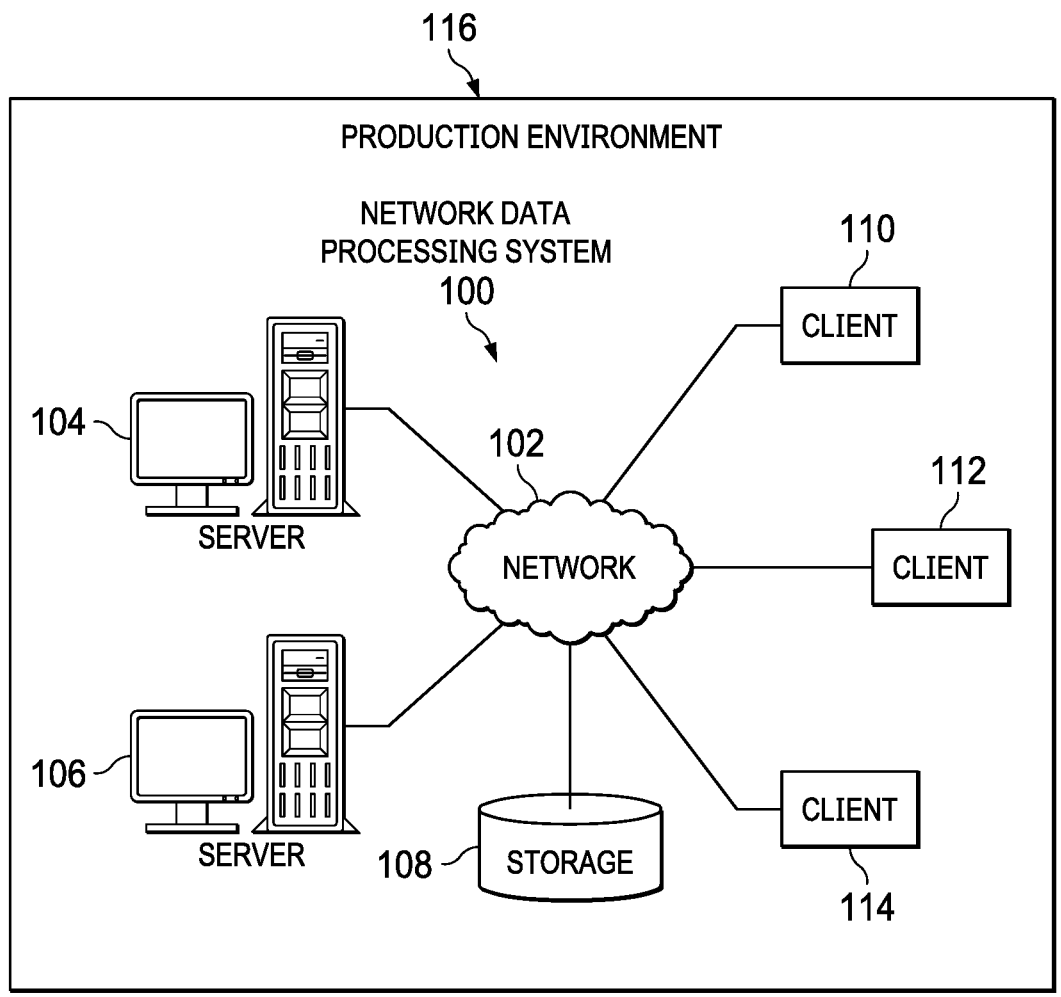
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
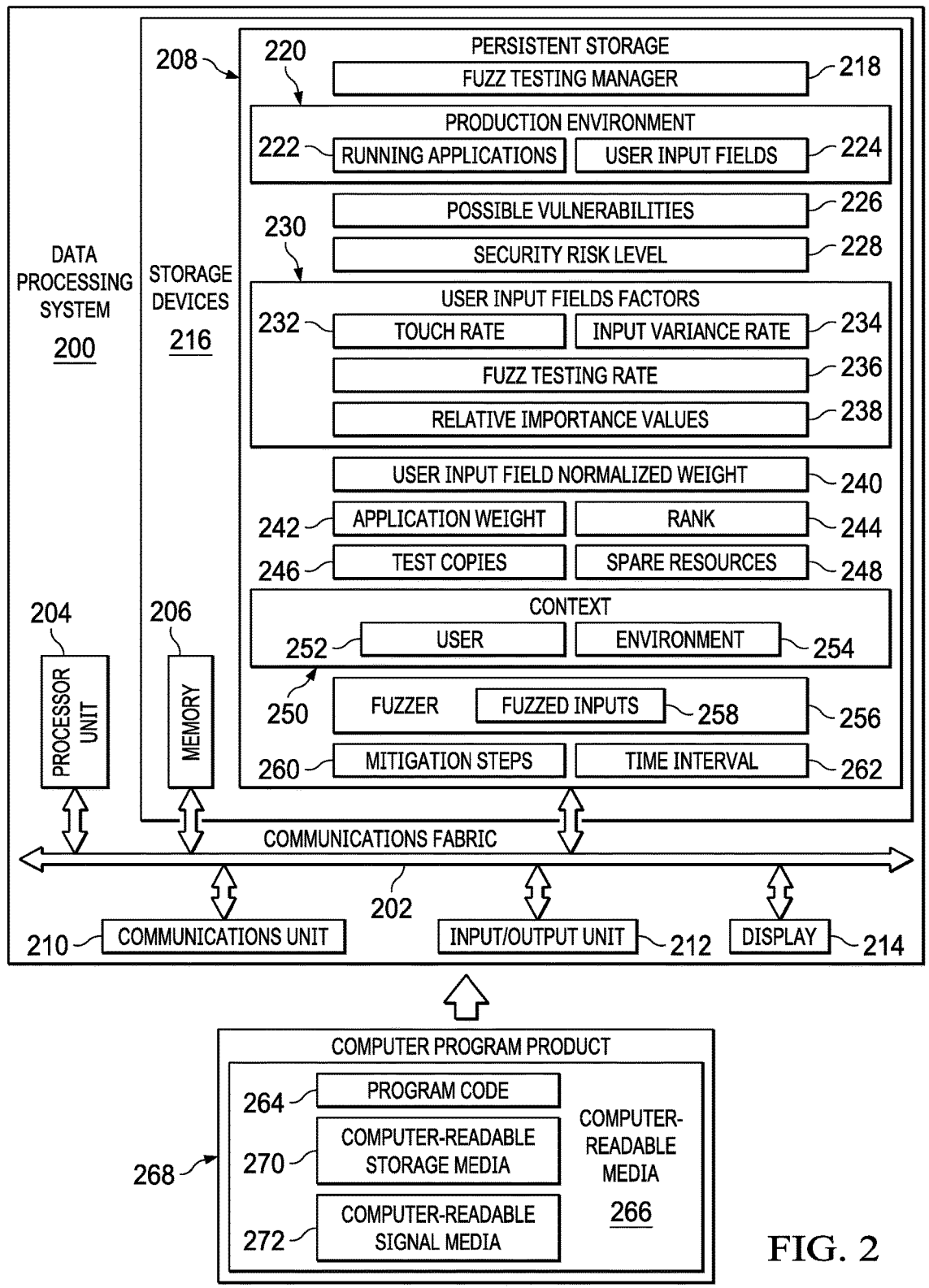
FIG. 2 is a diagram of a data processing system in which illustrative embodiments may be implemented.

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 and server 106 provide application fuzz testing management services to client devices. The application fuzz testing management services may, for example, monitor and evaluate current usage of user input fields of running, in production applications to determine which of the user input fields to fuzz test. Server 104 and server 106 perform the fuzz testing of the selected user input fields using spare resources. The spare resources are standby, extra, or currently unused resources, such as, for example, currently unused processors, processor cycles, memory, storage space, and the like. Further, server 104 and server 106 may perform the fuzz testing of the selected user input fields using test copies of the running, in production applications.

Client 110, client 112, and client 114 also connect to network 102. Clients 110, 112, and 114 are clients of server 104 and server 106. Each of clients 110, 112, and 114 hosts a set of one or more running, in production applications. In this example, clients 110, 112, and 114 are network computers that provide services to users who are accessing and utilizing their corresponding applications. The services may be, for example, financial services, banking services, educational services, governmental services, entertainment services, reservation services, data services, search services, gaming services, and the like. The users access the services by using devices, such as, for example, desktop or personal computers, laptop computers, handheld computers, smart phones, smart watches, smart televisions, smart appliances, gaming devices, kiosks, and the like. The users interact with the services by utilizing and entering inputs, such as, for example, data or values, into user input fields included in the running, in production applications.

Servers 104 and 106 and clients 110, 112, and 114 are located in production environment 116. Production environment 116 is a real-world production environment. The real-world production environment may be, for example, a data center. Alternatively, the real-world production environment may be a cloud environment. Also, it should be noted that servers 104 and 106 may be located remotely from production environment 116. In other words, servers 104 and 106 are providing the application fuzz testing services to production environment 116 instead of being a part of production environment 116.

Storage 108 is a network storage device capable of storing any type of data in a structured format or an unstructured format. In addition, storage 108 may represent a plurality of network storage devices. Further, storage 108 may store identifiers and network addresses for a plurality of different servers, identifiers and network addresses for a plurality of different client devices, identifiers for a plurality of different applications and user input fields, rules defining application business values and priorities, user input field statistics, identifiers for a plurality of different users, and the like. Furthermore, storage unit 108 may store other types of data, such as authentication or credential data that may include user names, passwords, and biometric data associated with system administrators and users, for example.

It should be noted that network data processing system 100 may include any number of additional servers, clients, storage devices, and other devices not shown. In addition, it should be noted that program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), a wide area network (WAN), a telecommunications network, or any combination thereof. FIG. 1 is intended as an example only, and not as an architectural limitation for the different illustrative embodiments.

With reference now to FIG. 2, a diagram of a data processing system is depicted in accordance with an illustrative embodiment. Data processing system 200 is an example of a computer, such as server 104 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random-access memory (RAM), or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores fuzz testing manager 218. However, it should be noted that even though fuzz testing manager 218 is illustrated as residing in persistent storage 208, in an alternative illustrative embodiment fuzz testing manager 218 may be a separate component of data processing system 200. For example, fuzz testing manager 218 may be a hardware component coupled to communication fabric 202 or a combination of hardware and software components. In another alternative illustrative embodiment, a first set of components of fuzz testing manager 218 may be located in data processing system 200 and a second set of components of fuzz testing manager 218 may be located in a second data processing system, such as, for example, server 106 or client 110 in FIG. 1. In yet another alternative illustrative embodiment, fuzz testing manager 218 may be located in client devices in addition to, or instead of, data processing system 200.

Fuzz testing manager 218 controls the process of optimizing utilization and effectiveness of spare resources via workload and environment management when fuzz testing running applications 222 in production environment 220 based on rules, self-learning, and real user interactions with user input fields 224 of running applications 222. However, it should be noted that fuzz testing manager 218 may improve utilization and effectiveness of the spare resources without improving the utilization and effectiveness to the maximal extent. Production environment 220 is a real-world production environment, such as, for example, production environment 116 in FIG. 1. Running applications 222 represent a plurality of applications running in production environment 220 and may represent any type of application providing any type of service to users.

Running applications 222 are hosted by clients of data processing system 200, such as clients 110, 112, and 114 of FIG. 1. Further, each of running applications 222 include a set of one or more user input fields 224. User input fields 224 represent defined areas within a corresponding application where a user may enter an input, such as data or values, in order to interact with that particular application. User input fields 224 may include, for example, text fields, password fields, check boxes, radio buttons, sliders, and/or other fields designed to receive user input.

Possible vulnerabilities 226 represent known software vulnerabilities that may be detected in running applications 222. Fuzz testing manager 218 may identify possible vulnerabilities 226 using, for example, Open Web Application Security Project Common Weakness Enumeration information. The Open Web Application Security Project helps organizations or enterprises understand and improve web application and web service security. The Common Weakness Enumeration information focuses on the most serious software vulnerabilities.

Security risk level 228 represents as level of security risk assigned to each respective application in running applications 222. An owner or provider of a particular application may provide the security risk level or rating corresponding to that particular application. Alternatively, fuzz testing manager 218 may generate the security risk level based on one or more different factors, such as, for example, threat intelligence data. Threat intelligence is analysis of potential computer and network security threats to an organization or enterprise.

User input fields factors 230 represent current statistics regarding each particular user input field of user input fields 224. For example, user input fields factors 230 include touch rate 232, input variance rate 234, fuzz testing rate 236, and relative importance values 238. Touch rate 232 represents the actual usage or number of times a user accesses and inputs data or values into a particular user input field. Input variance rate 234 represents the actual number and type of user input variations submitted in a particular user input field. Fuzz testing rate 236 represents the actual number of times a particular user input field was previously fuzz tested for software bugs or vulnerabilities. Relative importance values 238 represent a level of significance or weighting value that fuzz testing manager 218 is to apply to each of touch rate 232, input variance rate 234, and fuzz testing rate 236 when calculating user input field normalized weight 240 for each respective user input field of user input fields 224. An owner or provider of an application may assign relative importance values 238 to each of touch rate 232, input variance rate 234, and fuzz testing rate 236. User input field normalized weight 240 represents an overall weight or significance of each particular user input field as based on normalized values for of touch rate 232, input variance rate 234, and fuzz testing rate 236.

Fuzz testing manager 218 also calculates application weight 242 for each respective application of running applications 222. Fuzz testing manager 218 calculates application weight 242 for a particular running application based on possible vulnerabilities 226 and security risk level 228 associated with that particular running application and user input field normalized weight 240 associated with each of the user input fields of that particular running application. Then, fuzz testing manager 218 calculates rank 244 for each respective running application of running applications 222 based on each application's corresponding application weight 242. Rank 244 represents a fuzz testing priority score. In other words, fuzz testing manager 218 performs fuzz testing on a highest-ranking application, which has highest fuzz testing priority, first, before fuzz testing other lower ranking applications. In addition, fuzz testing manager 218 may perform fuzz testing only on a select set of highest-ranking applications having a rank (i.e., fuzz testing priority score) above a defined threshold.

Furthermore, fuzz testing manager 218 may utilize test copies 246 to perform the fuzz testing. Test copies 246 represent mirrored copies of running applications 222 that fuzz testing manager 218 utilizes to perform fuzz testing of running applications 222. Moreover, fuzz testing manager 218 utilizes spare resources 248 to perform the fuzz testing. Spare resources 248 may include, for example, spare processors, spare processor cycles, unallocated memory, unused storage space, currently available virtual machines, and the like. Spare resources 248 may be extra or currently available resources of data processing system 200 and/or extra or currently available resources of production environment 220.

Context 250 represents the current real-world circumstances, settings, or situation corresponding to user 252 and environment 254. It should be noted that user 252 represents a plurality of different users. Context 250 of user 252 may include, for example, user identification, date and time of application accesses, user devices utilized to perform the application accesses, identification of user input fields utilized within the accessed applications, snapshots or clones of actual user inputs inputted into the identified user input fields, and the like. Context 250 of environment 254 includes the current settings and situation of production environment 220, which may include, for example, network bandwidth, network latency, available processing power, available memory, available storage space, number and type of running applications, number and type of service requests, and the like.

Fuzz testing manager 218 utilizes fuzzer 256 to execute the application fuzz testing. Fuzzer 256 is a software program or script configured to identify software bugs and vulnerabilities within an application, especially with regard to user input fields. Fuzzer 256 generates fuzzed inputs 258 for input into test copies 246 for the fuzz testing. Fuzzer 256 generates fuzzed inputs 258 based on context 250 of user 252 and environment 254. Fuzzed inputs 258 may include, for example, valid, semi-valid, and/or random inputs. In addition, fuzzer 256 may generalize fuzzed inputs 258 to protect user privacy and confidential or sensitive data.

Upon detection of a software bug or vulnerability in a fuzz tested application, fuzzer 256 performs mitigation steps 260. Mitigation steps 260 represent a set of action steps to eliminate or lessen the effect of a detected software bug or vulnerability. For example, mitigation steps 260 may include fuzzer 256 sending an alert to a system administrator or security analyst for review and possible action. In addition, mitigation steps 260 may also include fuzzer 256 automatically fixing a detected software bug or eliminating an ability to exploit a detected vulnerability. For example, fuzzer 256 may direct fuzz testing manager 218 to block real-world input into the running, in production application corresponding to the fuzz tested copy of the application to eliminate the ability to exploit the detected vulnerability until corrective action can be taken or the vulnerability addressed.

Time interval 262 represents a defined period of time, such as, for example, 1 hour, 6 hours, 12 hours, 1 day, 1 week, 2 weeks, 1 month, or any other increment of time. Fuzz testing manager 218 utilizes time interval 262 to determine when to automatically reevaluate running applications 222 and their corresponding user input fields 224 on a regular time interval basis, such as hourly, daily, weekly, or the like. However, it should be noted that fuzz testing manager 218 may utilize other criteria, such as, for example, when a new application is added to production environment 220, when users change interaction with a running application, when logical or physical hosting of a running application changes, or when security attributes of a running application changes, to trigger a reevaluation of running applications 222 and their corresponding user input fields 224. Alternatively, fuzz testing manager 218 may reevaluate running applications 222 and their corresponding user input fields 224 on a continuous or near-continuous basis.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 264 is located in a functional form on computer readable media 266 that is selectively removable and may be loaded onto or transferred to data processing system 200 for running by processor unit 204. Program code 264 and computer readable media 266 form computer program product 268. In one example, computer readable media 266 may be computer readable storage media 270 or computer readable signal media 272. Computer readable storage media 270 may include, for example, an optical or magnetic disc that is inserted or placed into a drive or other device that is part of persistent storage 208 for transfer onto a storage device, such as a hard drive, that is part of persistent storage 208. Computer readable storage media 270 also may take the form of a persistent storage, such as a hard drive, a thumb drive, or a flash memory that is connected to data processing system 200. In some instances, computer readable storage media 270 may not be removable from data processing system 200.

Alternatively, program code 264 may be transferred to data processing system 200 using computer readable signal media 272. Computer readable signal media 272 may be, for example, a propagated data signal containing program code 264. For example, computer readable signal media 272 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 264 may be downloaded over a network to persistent storage 208 from another device or data processing system through computer readable signal media 272 for use within data processing system 200. For instance, program code stored in a computer readable storage media in a data processing system may be downloaded over a network from the data processing system to data processing system 200. The data processing system providing program code 264 may be a server computer, a client computer, or some other device capable of storing and transmitting program code 264.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 270 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

One method for finding bugs in an application is fuzz testing, where valid inputs are manipulated systematically in order to expose a programming error that may lead to undesirable behavior of the application. However, fuzz testing is time-consuming (e.g., due to the large number of possibilities that need to be explored and the extremely large number of combinations of valid input parameters) and is difficult to automate (e.g., because human intelligence is often needed to determine a valid starting point for the fuzz testing).

While fuzz testing methods are known, illustrative embodiments dynamically optimize the fuzz testing effort across all applications currently deployed in a data processing system. Illustrative embodiments optimize allocation of resources (e.g., processor, memory, storage, and the like) performing the fuzz testing by setting up context for the fuzz testing based on real user input in a real-world system environment, which conforms to the business value of the application and prior fuzz testing activities. Illustrative embodiments utilize spare resource capacity in order to continually perform fuzz testing activities while different applications in the system run.

Thus, illustrative embodiments provide a technical solution to a computer-centric problem, which is not currently available in the prior art, associated with fuzz testing by utilizing a fuzz testing context that is identical to the real-world production application use context. Of the almost infinite number of fuzz testing contexts, illustrative embodiments identify the contexts that are typically valid. This real-world understanding allows illustrative embodiments to generate better fuzz testing inputs and better fuzz testing results. It should be noted that the cost to identify the fuzz testing context is small. For example, illustrative embodiments can distribute fuzz testing effort among various fuzz testing systems. In addition, the cost of fuzz testing may be assumed by the owners or providers of the applications.

Illustrative embodiments, based on business rules, automatically adjust the fuzz testing regimen when a new application is added to the system, when a user changes interaction with the application, when the logical or physical hosting location of the application changes, or when security attributes of the application changes. When an application is hosted by the system and in productive use, illustrative embodiments can typically generate another instance or other instances of the same application within that environment for little or no additional cost. Illustrative embodiments may utilize the additional instance or instances of the application as a fuzz testing tool. While generating multiple instances of an application for conducting fuzz testing in parallel is known, it is not known to generate an application instance based on a context of the currently running, in production application, while also using generalized, recently supplied real user input to the production application as the seed input for fuzz testing. By using generalized, recently supplied real user input as the seed input for the fuzz testing, illustrative embodiments are able to provide more varied test input than what would be expected during scripted fuzz testing. In addition, illustrative embodiments can automatically prioritize applications having a higher security risk level in the system, such as those applications processing external input or accessing datastores, for fuzz testing over applications having a lower level of security risk.

In addition to fuzzing the real user-supplied context of the application, illustrative embodiments may also fuzz the environmental context for both availability and security testing by, for example, adding artificial network latency, central processing unit (CPU) contention, memory constraints, and/or disk contention. Illustrative embodiments may also perform application profiling to find out the most likely resource constraints (e.g., CPU), and then fuzz parameters, attributes, or characteristics of those resources (e.g., decrease number of available CPU cycles). Application profiling also is known, but generating an "optimization engine" that allows the owner or provider of the application to interpret descriptions of the business rules or parameters by which the application owner or provider wishes to control the fuzz testing and to control the extent of and type of real user input to the application for fuzz testing is novel.

Further, illustrative embodiments coordinate fuzz testing between running production applications so that different user interactions with the applications are fuzz tested using different test instances of the applications. This fuzz testing coordination may be done by the system hosting the applications or by users. A fuzz testing coordinator can prioritize or select specific parts of an application to focus fuzz testing on by determining that fuzz testing should occur based only on certain contexts or certain inputs. The fuzz testing coordinator can generate a list of fuzz tests and then a user may check out and utilize a particular fuzz test.

By observing user interactions with an application, illustrative embodiments are able to select fuzz testing seed inputs that are least used. For example, the most used seed inputs are already naturally providing more varied inputs to illustrative embodiments in the course of normal operation of the system hosting the application. By focusing on least used seed inputs, illustrative embodiments may increase the likelihood of finding unknown software code shortcomings or errors.

Illustrative embodiments may integrate fuzz testing capability into any sort of load balancing or proxying solution. For example, illustrative embodiments may utilize Kubernetes microservices to define both the production application and a mirrored copy of the application for fuzz testing purposes. Illustrative embodiments may capture user inputs sent to one microservice, fuzz the user inputs using determined priorities, and send the fuzzed user inputs to test copies of the microservices.

The idea is to perform fuzz testing on the different running, in production applications (or microservices) in the system and the different user input fields within the applications. For example, if a running application or user input field is getting sufficient fuzz testing in the real-world environment, then illustrative embodiments will not perform fuzz testing on that application as much, if at all. Similarly, if illustrative embodiments have been fuzz testing an application or user input field for a while (e.g., greater than a threshold), then illustrative embodiments will schedule a different application and/or user input field that needs fuzz testing.

When a new application is added to the system and begins receiving user inputs, illustrative embodiments evaluate the real user inputs and add the corresponding user input fields of the application to the fuzz testing queue. In addition, illustrative embodiments may instantiate one or more additional copies of the applications prior to receiving user interactions and then allocate one or more of the previously instantiated copies of the application for fuzz testing. For each user input field within the scope of the fuzz testing, illustrative embodiments determine its priority for fuzz testing based on the degree the thresholds corresponding to each user input field are exceeded. For example, illustrative embodiments will prioritize a user input field that has a low usage rate, high input variance rate, and low number of prior fuzz testing higher in the queue as compared to a user input field that has a high usage rate, low input variance rate, and high number of prior fuzz testing. User input fields that receive enough fuzz testing via normal use or via prior fuzz testing (e.g., above a threshold amount of fuzz testing) are not fuzz tested, which saves fuzz testing resources (e.g., processor cycles, memory, and storage space) and increases system performance by only fuzz testing specific user input fields. Thus, illustrative embodiments provide a significant improvement over current fuzz testing solutions.

After illustrative embodiments run fuzz testing jobs for a configurable amount of time, illustrative embodiments re-run the process and reevaluate the values (particularly prior fuzz testing amount), which changes fuzz testing priorities for the user input fields. If thresholds are met, then illustrative embodiments will remove that particular user input field from the fuzz testing queue.

Illustrative embodiments utilize three different phases corresponding to fuzz testing. For example, illustrative embodiments utilize a preparation phase, an evaluation phase, and a testing phase. During the preparation phase, an application owner or provider defines the user and environmental contexts and user input fields of a production application that should be fuzz tested. In addition, the application owner or provider defines the maximum number of resources to be allocated to the fuzz testing. The application owner or provider also instantiates the production application and, if needed, a separate configuration for generating test copies of the production application (e.g., using a test database). Further, the application owner or provider defines relative importance (e.g., percentage of 100%) for different factors, such as, for example, the touch rate or usage of each particular user input field, input variance rate of each particular user input field, number of prior fuzz testing performed on each particular user input field, and the like. For example, the application owner or provider may define a 20% relative importance to the user input field touch rate, a 30% relative importance to the user input field input variance rate, and a 50% relative importance to the of user input field prior fuzz testing amount. Furthermore, the application owner or provider may optionally provide a security risk rating for the application. If the application owner or provider does not supply the security risk rating, then illustrative embodiments automatically determine the security risk level based on other factors, such as, for example, source of input (e.g., trusted or untrusted) and access to datastores. Moreover, a fuzz testing administrator provides a time threshold value, which is the amount of time spent fuzz testing a given application before reevaluating and revising fuzz testing priorities for the different user input fields.

During the evaluation phase, illustrative embodiments determine which user input fields to evaluate and fuzz test. On a predetermined time interval basis, or alternatively on a continuous basis, illustrative embodiments determine a user input field normalized weight for each user input field in each running production application. Illustrative embodiments determine how often a particular user input field is utilized in normal use, which is the user input field touch rate. For example, illustrative embodiments monitor the number of times a user accesses a particular input field during normal use and records statistics corresponding to each particular user input field regarding how often each particular user input field is utilized as compared to other user input fields. Illustrative embodiments then rank the user input fields by their corresponding historic usage rate and normalize the usage rate to a value between 1 and 10, with 10 indicating that a particular user input field has a high level of utilization. This normalized usage value is the user input field touch rate.

Also during the evaluation phase, illustrative embodiments determine how many different values users input into a particular user input field during normal use, which is the user input field input variance rate. For example, illustrative embodiments hash each user inputted value for user security and privacy concerns, accumulate the hashes, and count the number of unique hashes. Then, illustrative embodiments normalize the number of unique hashes to a value between 1 and 10, with 10 indicating that a particular user input field has a highest level of variance. This normalized value is the user input field input variance rate.

Further during the evaluation phase, illustrative embodiments determine the number of times a particular user input field has been previously fuzz tested, which is the user input field prior fuzz testing rate. For example, illustrative embodiments monitor a count of the number of times fuzz testing is performed on each particular user input field. Then, illustrative embodiments normalize the fuzz testing counts across all user input fields to a value between 1 and 10, with 10 indicating that a particular user input field has a highest amount of fuzz testing. This normalized value is the user input field prior fuzz testing rate or amount.

Afterward, based on applications owners' or providers' relative importance (i.e., priority) set for each user input field, illustrative embodiments generate the user input field normalized weight for each user input field using the normalized user input field touch rate, the normalized user input field input variance rate, and the normalized user input field prior fuzz testing rate corresponding to each particular user input field. As a result, illustrative embodiments generate a revised user input field normalized weight for each particular user input field on a predetermined time interval basis or on a continuous basis.

Furthermore during the evaluation phase, illustrative embodiments determine which running production applications to perform fuzz testing on. Illustrative embodiments evaluate the running production applications using the user input field evaluations as described above. For example, illustrative embodiments select a running production application and user input field to perform fuzz testing on based on the revised user input field normalized weight for each particular user input field. Illustrative embodiments rank the different running production applications based on a combination of application security risk level, user input field usage and input variance rate, and amount of previous fuzz testing. For example, illustrative embodiments rank higher (i.e., prioritize) running production applications that are susceptible to allowing privilege escalation (e.g., applications that take output from the Internet) or are susceptible to other specific issues such as SQL injection for applications that use a backend database. Illustrative embodiments rank lower running production applications that already have a higher rate of fuzz testing, for example.

For each running production application, illustrative embodiments generate a list of possible application vulnerability vectors (e.g., buffer overflow, brute force, serialization, and the like) based on, for example, Open Web Application Security Project Common Weakness Enumeration information. Illustrative embodiments assess the current "real-world" situation that is occurring (e.g., a particular vulnerability that is the current focus of a large number of attackers in the real-world) based on current threat intelligence input received from one or more threat intelligence sources. Illustrative embodiments then rank the possible application vulnerability vectors by likelihood of exploitation of a vulnerability in a particular running, in production application. Illustrative embodiments determine an overall security risk level for each running production application based on the possible application vulnerability vectors, current real-world situation, and optionally an application security risk rating if provided by an application owner or provider. Illustrative embodiments collect usage rate, input variance rate, and prior fuzz testing rate for each user input field in each particular running production application. Then, using the relative importance settings provided during the preparation phase, illustrative embodiments generate an application weight for each running production application based on the overall security risk level corresponding to each particular application and the collected usage rate, input variance rate, and prior fuzz testing rate for each user input field in each particular running production application.

When illustrative embodiments select a running production application during the evaluation phase, illustrative embodiments determine the highest-ranking user input fields in the selected application and perform fuzz testing on the riskiest application vulnerability vectors applicable to those highest-ranking user input fields. During the testing phase, illustrative embodiments instantiate a clone of the application user's current context. The clone of the application user's current context is an initialization vector for fuzz testing an application instance and includes a copy or snapshot of any persistent data per the fuzz testing configuration file.

Illustrative embodiments generate "fuzzed" inputs for user input fields based on real user inputs and system environmental characteristics, such as, for example, available storage space, processor cycle utilization, memory allocation, and the like. Illustrative embodiments track and record this information so that illustrative embodiments do not test the same fuzzed input twice. Based on the generated fuzzed inputs, illustrative embodiments initialize a starting point within the fuzz testing application instance and conduct the fuzz testing. If fuzz testing fails, then illustrative embodiments record conditions corresponding to the application vulnerability failure and perform a set of mitigation action steps to resolve or eliminate the security risk associated with the application vulnerability failure. Subsequently, after a defined time period has expired, illustrative embodiments execute the evaluation phase once again and reevaluate the running, in production applications and their corresponding user input fields.

Figure 3:
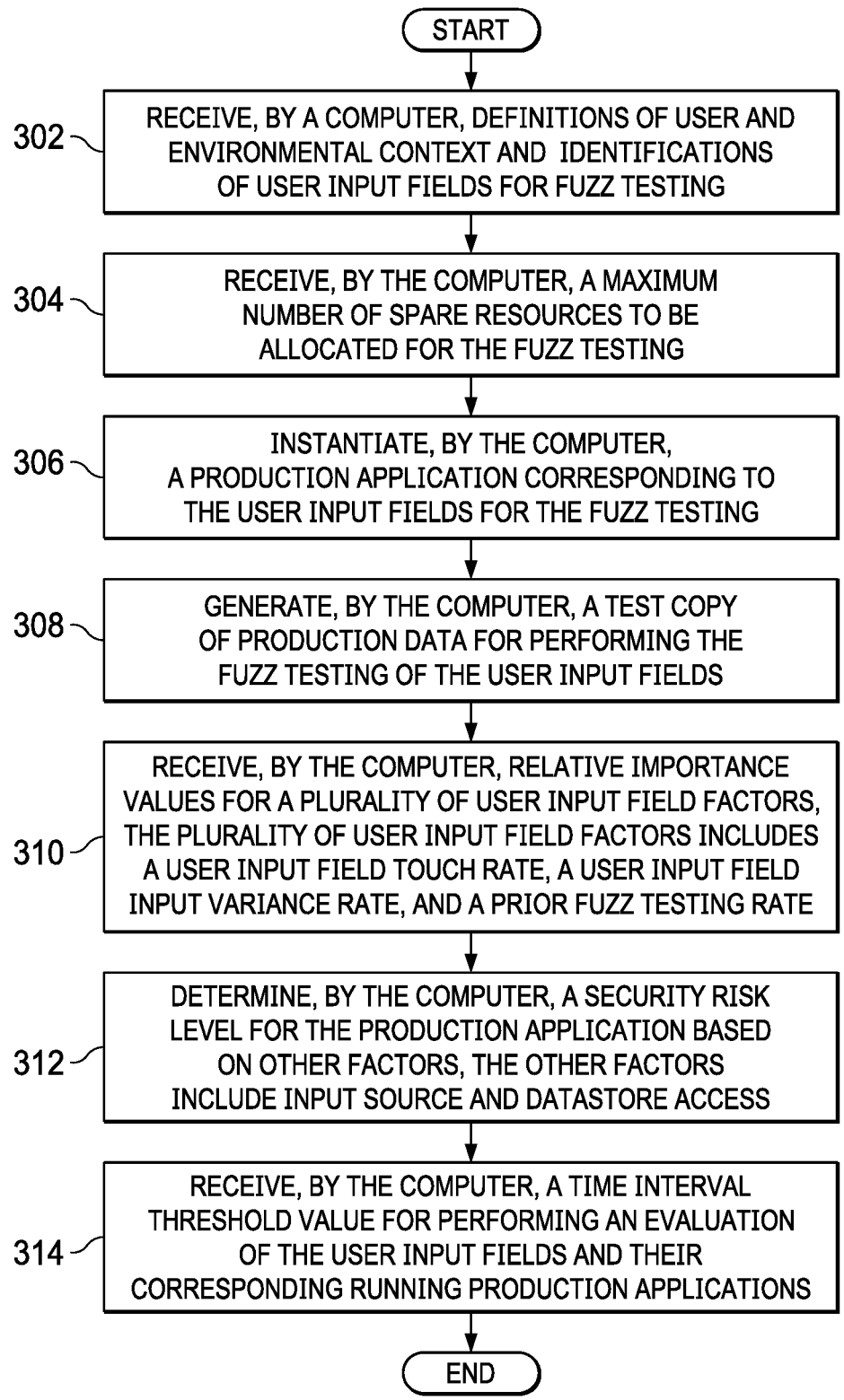
FIG. 3 is a flowchart illustrating a process for a preparation phase in accordance with an illustrative embodiment.

With reference now to FIG. 3, a flowchart illustrating a process for a preparation phase is shown in accordance with an illustrative embodiment. The process shown in FIG. 3 may be implemented in a computer, such as, for example, server 104 in FIG. 1.

The process begins when the computer receives definitions of user and environmental context and identifications of user input fields for fuzz testing (step 302). The computer also receives a maximum number of spare resources to be allocated for the fuzz testing (step 304).

In addition, the computer instantiates a production application corresponding to the user input fields for the fuzz testing (step 306). Further, the computer generates a test copy of the production data, if necessary, for performing the fuzz testing of the user input fields (step 308).

Furthermore, the computer receives relative importance values for a plurality of user input field factors (step 310). The plurality of user input field factors includes a user input field touch rate, a user input field input variance rate, and a prior fuzz testing rate. Moreover, the computer determines a security risk level for the production application based on other factors (step 312). The other factors include input source and datastore access, for example. The computer also receives a time interval threshold value for performing an evaluation of the user input fields and their corresponding running production applications (step 314). Thereafter, the process terminates.

Figure 4B:
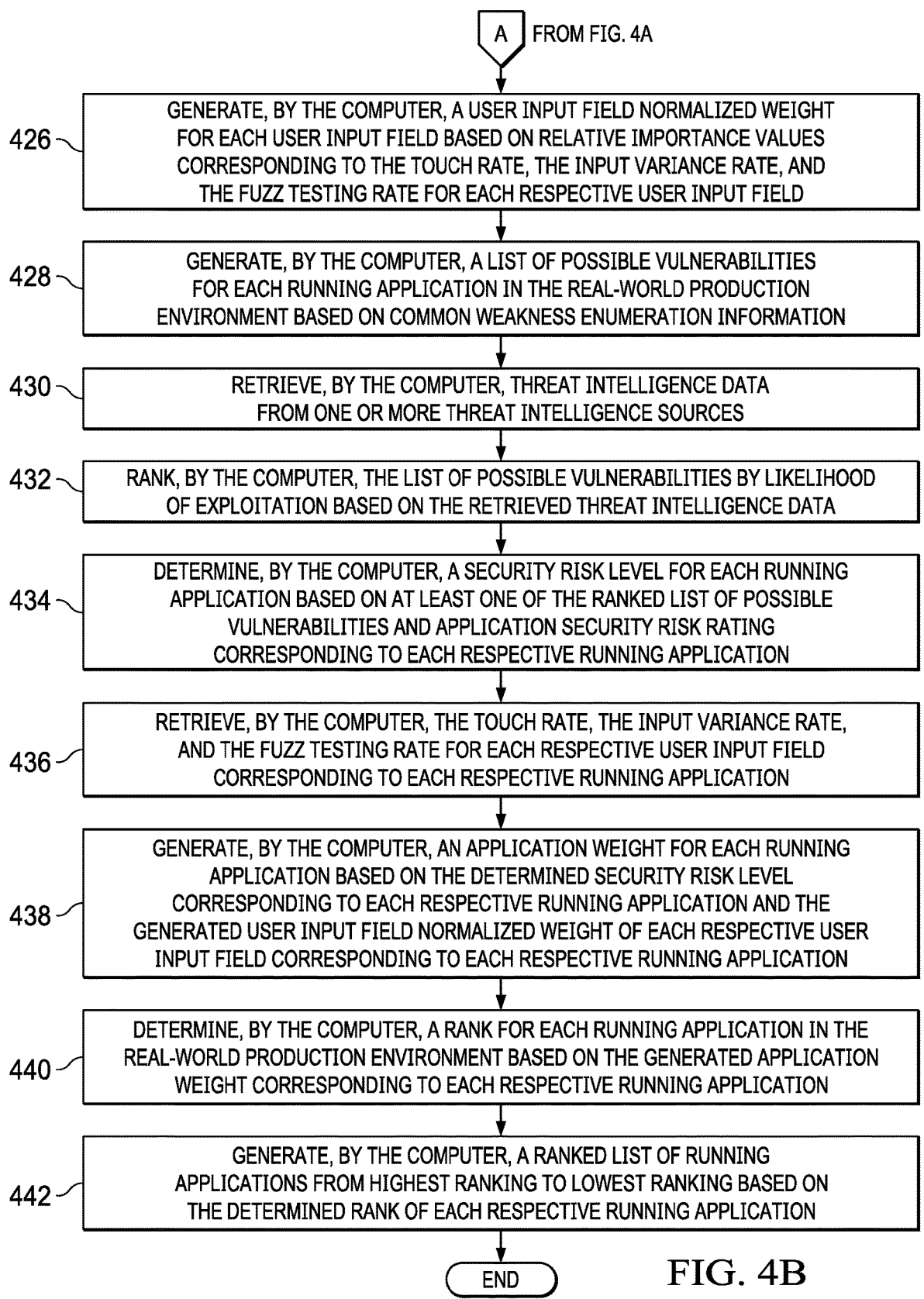

With reference now to FIGS. 4A-4B, a flowchart illustrating a process for an evaluation phase is shown in accordance with an illustrative embodiment. The process shown in FIGS. 4A-4B may be implemented in a computer, such as, for example, server 104 in FIG. 1.

The process begins when the computer records a number of times users access each particular user input field in a plurality of user input fields corresponding to running applications in a real-world production environment (step 402). The computer ranks each user input field of the plurality of user input fields based on a corresponding number of times that users accessed a particular user input field (step 404). The computer normalizes a usage rate of each respective user input field (step 406). The computer normalizes the usage rate of each respective user input field to a value between 1 and 10, where a 10 indicates a high level of usage. The computer uses the normalized usage rate as the touch rate for each respective user input field (step 408).

In addition, the computer records values input by one or more users into each user input field (step 410). The computer cryptographically hashes the values input by the users into each user input field (step 412). The computer may utilize, for example, a hash function, such as a one-way cryptographic hash function, to hash the input values. The computer counts the number of unique hashes for each user input field (step 414). The computer normalizes the number of unique hashes for each user input field (step 416). The computer normalizes the number of unique hashes for each user input field to a value between 1 and 10, where a 10 indicates a high level of variance. The computer uses the normalized number of unique hashes as the input variance rate for each respective user input field (step 418).

Further, the computer records the number of times fuzz testing has been previously performed on each user input field (step 420). The computer normalizes the number of fuzz testing for each user input field (step 422). The computer normalizes the number of fuzz testing for each user input field to a value between 1 and 10, where a 10 indicating a high level of fuzz testing. The computer uses the normalized number of fuzz testing as the fuzz testing rate for each respective user input field (step 424).

The computer generates a user input field normalized weight for each user input field based on relative importance values corresponding to the touch rate, the input variance rate, and the fuzz testing rate for each respective user input field (step 426). Moreover, the computer generates a list of possible vulnerabilities for each running application in the real-world production environment based on common weakness enumeration information (step 428). In addition, the computer retrieves threat intelligence data from one or more threat intelligence sources (step 430).

The computer ranks vulnerabilities in the list of possible vulnerabilities by likelihood of exploitation based on the retrieved threat intelligence data (step 432). The computer also determines a security risk level for each running application based on at least one of the ranked list of possible vulnerabilities and application security risk rating corresponding to each respective running application (step 434).

The computer retrieves the touch rate, the input variance rate, and the fuzz testing rate for each respective user input field corresponding to each respective running application (step 436). The computer generates an application weight for each running application based on the determined security risk level corresponding to each respective running application and the generated user input field normalized weight of each respective user input field corresponding to each respective running application (step 438).

Furthermore, the computer determines a rank for each running application in the real-world production environment based on the generated application weight corresponding to each respective running application (step 440). Afterward, the computer generates a ranked list of running applications from highest ranking to lowest ranking based on the determined rank of each respective running application (step 442). Thereafter, the process terminates.

Figure 5:
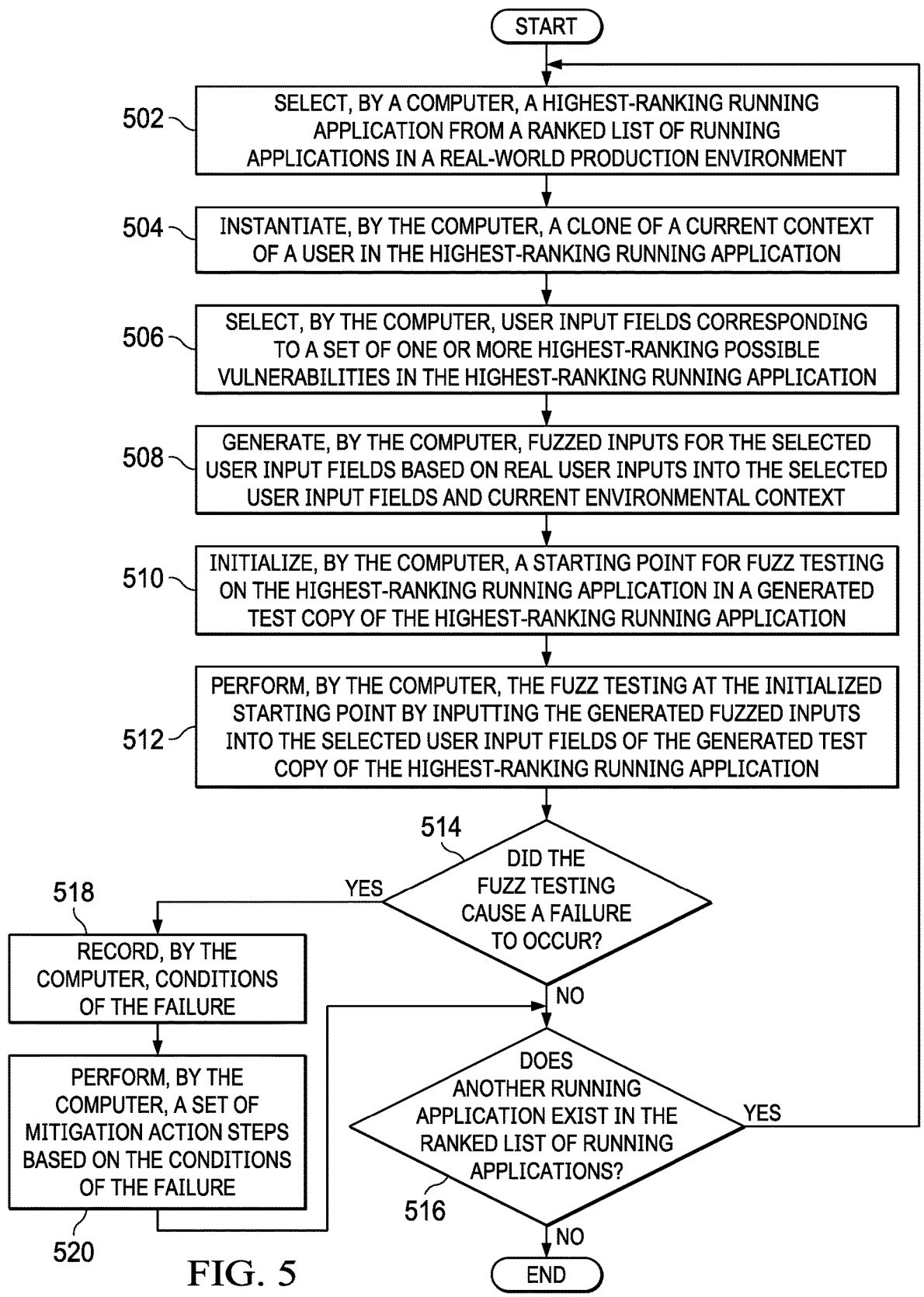
FIG. 5 is a flowchart illustrating a process for a testing phase in accordance with an illustrative embodiment.

With reference now to FIG. 5, a flowchart illustrating a process for a testing phase is shown in accordance with an illustrative embodiment. The process shown in FIG. 5 may be implemented in a computer, such as, for example, server 104 in FIG. 1.

The process begins when the computer selects a highest-ranking running application from a ranked list of running applications in a real-world production environment (step 502). Afterward, the computer instantiates a clone of a current context of a user in the highest-ranking running application (step 504). In addition, the computer selects user input fields corresponding to a set of one or more highest ranking possible vulnerabilities in the highest-ranking running application (step 506).

The computer generates fuzzed inputs for the selected user input fields based on snapshots of real user inputs into the selected user input fields and current environmental context (step 508). Further, the computer initializes a starting point for fuzz testing on the highest-ranking running application in a generated test copy of the highest-ranking running application (step 510). Subsequently, the computer performs the fuzz testing at the initialized starting point by inputting the generated fuzzed inputs into the selected user input fields of the generated test copy of the highest-ranking running application (step 512).

The computer makes a determination as to whether the fuzz testing caused a failure to occur in the generated test copy of the highest-ranking running application (step 514). If the computer determines that the fuzz testing did not cause a failure to occur, no output of step 514, then the computer makes a determination as to whether another running application exists in the ranked list of running applications (step 516). If the computer determines that another running application does exist in the ranked list of running applications, yes output of step 516, then the process returns to step 502 where the computer selects the next highest-ranking running application in the ranked list. If the computer determines that another running application does not exist in the ranked list of running applications, no output of step 516, then the process terminates thereafter.

Returning again to step 514, if the computer determines that the fuzz testing did cause a failure to occur, yes output of step 514, then the computer records conditions of the failure (step 518). In addition, the computer performs a set of mitigation action steps based on the conditions of the failure (step 520). Thereafter, the process returns to step 516 where the computer makes a determination as to whether another running application exists in the ranked list.

Figure 6:
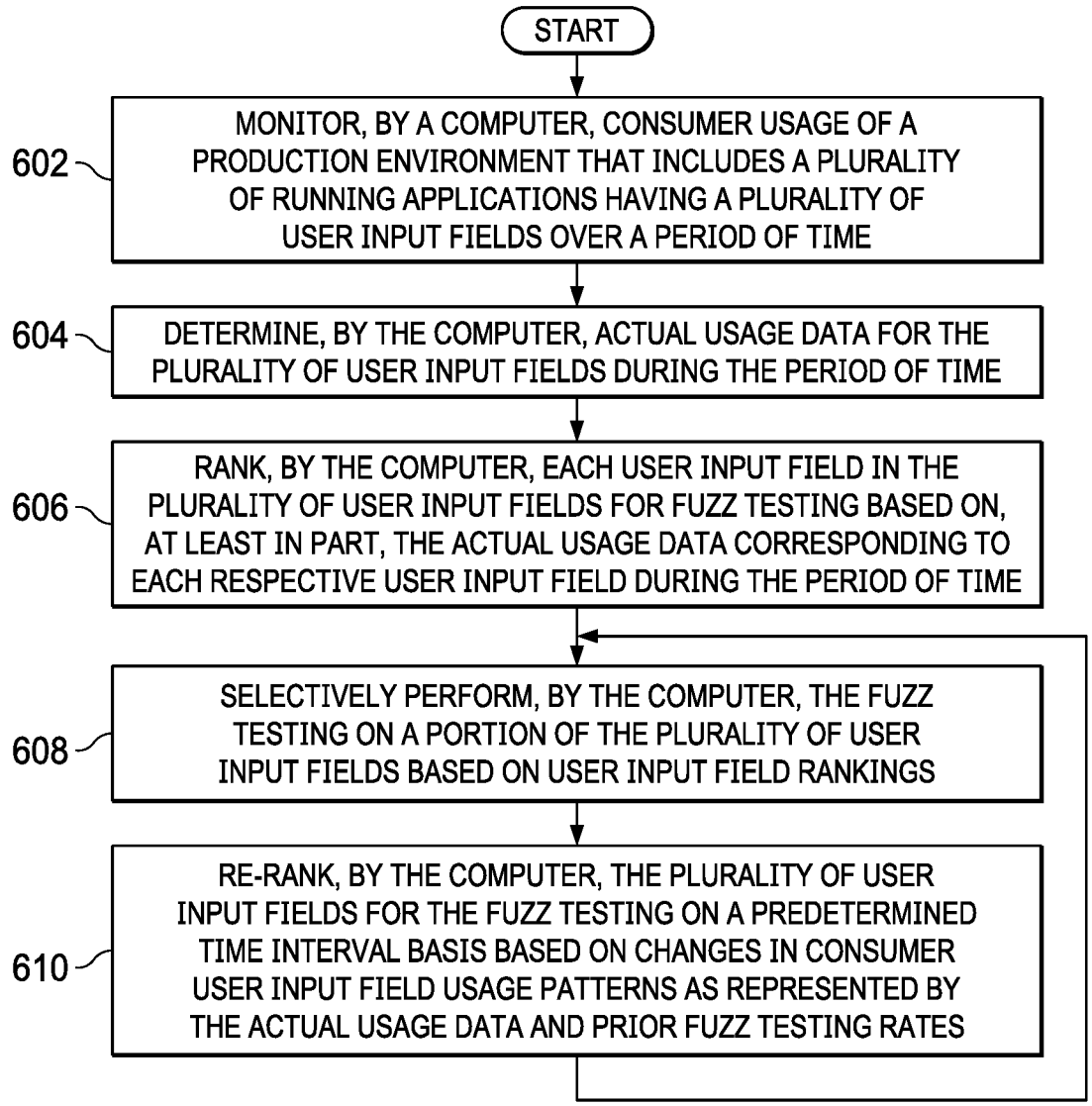
FIG. 6 is a flowchart illustrating a process for performing fuzz testing of application user input fields in accordance with an illustrative embodiment.

With reference now to FIG. 6, a flowchart illustrating a process for performing fuzz testing of application user input fields is shown in accordance with an illustrative embodiment. The process shown in FIG. 6 may be implemented in a computer, such as, for example, server 104 in FIG. 1.

The process begins when the computer monitors consumer use of a production environment that includes a plurality of running applications having a plurality of user input fields over a period of time (step 602). Consumer use as used herein is the actual live utilization of the plurality of user input fields within the plurality of running applications of a production environment, such as a data center or cloud environment, by a set of one or more consumers (e.g., users) over a particular time interval. The computer determines actual usage data for the plurality of user input fields during the period of time (step 604). The actual usage data include data of a type selected from the group consisting of a relative number of times each user input field is accessed by users and a relative variance in inputs to each user input field based on a number of unique input types for each respective user input field. The computer ranks each user input field in the plurality of user input fields for fuzz testing based on, at least in part, the actual usage data corresponding to each respective user input field during the period of time (step 606).

The computer selectively performs the fuzz testing on a portion of the plurality of user input fields based on user input field rankings (step 608). Furthermore, the computer re-ranks the plurality of user input fields for the fuzz testing on a predetermined time interval basis based on changes in consumer user input field usage patterns as represented by the actual usage data and prior fuzz testing rates (step 610). For example, even though a particular user input field has a low usage rate, that particular user input field may not need further fuzz testing because that particular user input field currently has a high fuzz testing rate. Thus, the computer is able to dynamically adapt to real-world changes in consumer usage patterns of the user input fields that occur over time. Thereafter, the process returns to step 608 where the computer performs fuzz testing of the re-ranked user input fields.

Thus, illustrative embodiments of the present invention provide a computer-implemented method, computer system, and computer program product for effective utilization of spare resources via workload and environment management when fuzz testing running applications in a real-world production environment based on rules, self-learning, and real user interactions with user input fields of the running applications. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for improved utilization of spare resources for fuzz testing, the computer-implemented method comprising:
   monitoring, by a computer, consumer use of a production environment that includes a plurality of running applications having a plurality of user input fields over a period of time;
   determining, by the computer, actual usage data for the plurality of user input fields during the period of time;
   ranking, by the computer, each user input field in the plurality of user input fields for fuzz testing based on, at least in part, the actual usage data corresponding to each respective user input field during the period of time; and
   selectively performing, by the computer, the fuzz testing on a portion of the plurality of user input fields based on user input field rankings.

2. The computer-implemented method of claim 1 further comprising:
   re-ranking, by the computer, the plurality of user input fields for the fuzz testing on a predetermined time interval basis based on changes in consumer user input field usage patterns as represented by the actual usage data and prior fuzz testing rates.

3. The computer-implemented method of claim 1 further comprising:
   selecting, by the computer, a running application from a ranked list of running applications in the production environment;
   instantiating, by the computer, a clone of a current context of a consumer in the running application;
   selecting, by the computer, user input fields corresponding to a set of one or more possible vulnerabilities in the running application; and
   generating, by the computer, fuzzed inputs for the selected user input fields based on snapshots of real consumer inputs into the selected user input fields and current environmental context.

4. The computer-implemented method of claim 1 further comprising:
   initializing, by the computer, a starting point for the fuzz testing on a running application in a generated test copy of the running application; and
   performing, by the computer, the fuzz testing at the starting point by inputting generated fuzzed inputs into selected user input fields of the generated test copy of the running application.

5. The computer-implemented method of claim 1 further comprising:
   determining, by the computer, whether the fuzz testing caused a failure to occur;
   responsive to the computer determining that the fuzz testing did cause a failure to occur, recording, by the computer, conditions of the failure; and
   performing, by the computer, a set of mitigation action steps based on the conditions of the failure.

6. The computer-implemented method of claim 1 further comprising:
   recording, by the computer, a number of times consumers access each particular user input field in the plurality of user input fields corresponding to the plurality of running applications in the production environment;
   ranking, by the computer, each user input field of the plurality of user input fields based on a corresponding number of times that consumers accessed a particular user input field;
   normalizing, by the computer, a usage rate of each respective user input field; and
   using, by the computer, the normalized usage rate as a touch rate for each respective user input field.

7. The computer-implemented method of claim 1 further comprising:
   recording, by the computer, values input by one or more consumers into each user input field of the plurality of user input fields;
   hashing, by the computer, the values input by the consumers into each user input field;
   counting, by the computer, a number of unique hashes for each user input field;
   normalizing, by the computer, the number of unique hashes for each user input field; and
   using, by the computer, the normalized number of unique hashes as an input variance rate for each respective user input field.

8. The computer-implemented method of claim 1 further comprising:
   recording, by the computer, a number of times fuzz testing has been previously performed on each user input field;
   normalizing, by the computer, the number of fuzz testing for each user input field; and
   using, by the computer, the normalized number of fuzz testing as a fuzz testing rate for each respective user input field.

9. The computer-implemented method of claim 1 further comprising:
   generating, by the computer, a user input field normalized weight for each user input field based on relative importance values corresponding to a touch rate, an input variance rate, and a fuzz testing rate for each respective user input field.

10. The computer-implemented method of claim 1 further comprising:
    generating, by the computer, a list of possible vulnerabilities for each of the plurality of running applications in the production environment based on common weakness enumeration information;
    retrieving, by the computer, threat intelligence data from one or more threat intelligence sources;
    ranking, by the computer, vulnerabilities in the list of possible vulnerabilities by likelihood of exploitation based on the retrieved threat intelligence data; and
    determining, by the computer, a security risk level for each of the plurality of running applications based on at least one of the ranked list of possible vulnerabilities and application security risk rating corresponding to each respective running application.

11. The computer-implemented method of claim 1 further comprising:
    retrieving, by the computer, a touch rate, an input variance rate, and a fuzz testing rate for each respective user input field corresponding to each respective running application;
    generating, by the computer, an application weight for each of the plurality of running applications based on a determined security risk level corresponding to each respective running application and a generated user input field normalized weight of each respective user input field corresponding to each respective running application;

determining, by the computer, a rank for each of the plurality of running applications in the production environment based on the generated application weight corresponding to each respective running application; and generating, by the computer, a ranked list of running applications based on a determined rank of each respective running application.

12. The computer-implemented method of claim 1, wherein the actual usage data include data of a type selected from the group consisting of a relative number of times each user input field is accessed by users and a relative variance in inputs to each user input field based on a number of unique input types for each respective user input field.

13. A computer system for improved utilization of spare resources for fuzz testing, the computer system comprising:
a bus system;
a storage device connected to the bus system, wherein the storage device stores program instructions; and
a processor connected to the bus system, wherein the processor executes the program instructions to:
monitor consumer use of a production environment that includes a plurality of running applications having a plurality of user input fields over a period of time;
determine actual usage data for the plurality of user input fields during the period of time;
rank each user input field in the plurality of user input fields for fuzz testing based on, at least in part, the actual usage data corresponding to each respective user input field during the period of time; and
selectively perform the fuzz testing on a portion of the plurality of user input fields based on user input field rankings.

14. The computer system of claim 13, wherein the processor further executes the program instructions to:
re-rank the plurality of user input fields for the fuzz testing on a predetermined time interval basis based on changes in consumer user input field usage patterns as represented by the actual usage data and prior fuzz testing rates.

15. The computer system of claim 13, wherein the processor further executes the program instructions to:
select a running application from a ranked list of running applications in the production environment;
instantiate a clone of a current context of a consumer in the running application;
select user input fields corresponding to a set of one or more possible vulnerabilities in the running application; and
generate fuzzed inputs for the selected user input fields based on snapshots of real consumer inputs into the selected user input fields and current environmental context.

16. The computer system of claim 13, wherein the processor further executes the program instructions to:
initialize a starting point for the fuzz testing on a running application in a generated test copy of the running application; and
perform the fuzz testing at the starting point by inputting generated fuzzed inputs into selected user input fields of the generated test copy of the running application.

17. The computer system of claim 13, wherein the processor further executes the program instructions to:

determine whether the fuzz testing caused a failure to occur;
record conditions of the failure in response to determining that the fuzz testing did cause a failure to occur; and
perform a set of mitigation action steps based on the conditions of the failure.

18. A computer program product for improved utilization of spare resources for fuzz testing, the computer program product comprising a computer readable storage medium having program instructions embodied therewith, the program instructions executable by a computer to cause the computer to perform a method comprising:
monitoring, by a computer, consumer use of a production environment that includes a plurality of running applications having a plurality of user input fields over a period of time;
determining, by the computer, actual usage data for the plurality of user input fields during the period of time;
ranking, by the computer, each user input field in the plurality of user input fields for fuzz testing based on, at least in part, the actual usage data corresponding to each respective user input field during the period of time; and
selectively performing, by the computer, the fuzz testing on a portion of the plurality of user input fields based on user input field rankings.

19. The computer program product of claim 18 further comprising:
re-ranking, by the computer, the plurality of user input fields for the fuzz testing on a predetermined time interval basis based on changes in consumer user input field usage patterns as represented by the actual usage data and prior fuzz testing rates.

20. The computer program product of claim 18 further comprising:
selecting, by the computer, a running application from a ranked list of running applications in the production environment;
instantiating, by the computer, a clone of a current context of a consumer in the running application;
selecting, by the computer, user input fields corresponding to a set of one or more possible vulnerabilities in the running application; and
generating, by the computer, fuzzed inputs for the selected user input fields based on snapshots of real consumer inputs into the selected user input fields and current environmental context.

21. The computer program product of claim 18 further comprising:
initializing, by the computer, a starting point for the fuzz testing on a running application in a generated test copy of the running application; and
performing, by the computer, the fuzz testing at the starting point by inputting generated fuzzed inputs into selected user input fields of the generated test copy of the running application.

22. The computer program product of claim 18 further comprising:
determining, by the computer, whether the fuzz testing caused a failure to occur;
responsive to the computer determining that the fuzz testing did cause a failure to occur, recording, by the computer, conditions of the failure; and
performing, by the computer, a set of mitigation action steps based on the conditions of the failure.

23. The computer program product of claim 18 further comprising:

recording, by the computer, a number of times consumers access each particular user input field in the plurality of user input fields corresponding to the plurality of running applications in the production environment;

ranking, by the computer, each user input field of the plurality of user input fields based on a corresponding number of times that consumers accessed a particular user input field;

normalizing, by the computer, a usage rate of each respective user input field; and using, by the computer, the normalized usage rate as a touch rate for each respective user input field.

24. The computer program product of claim 18 further comprising:

recording, by the computer, values input by one or more consumers into each user input field of the plurality of user input fields;

hashing, by the computer, the values input by the consumers into each user input field;

counting, by the computer, a number of unique hashes for each user input field;

normalizing, by the computer, the number of unique hashes for each user input field; and using, by the computer, the normalized number of unique hashes as an input variance rate for each respective user input field.

25. The computer program product of claim 18 further comprising:

recording, by the computer, a number of times fuzz testing has been previously performed on each user input field;

normalizing, by the computer, the number of fuzz testing for each user input field; and using, by the computer, the normalized number of fuzz testing as a fuzz testing rate for each respective user input field.

* * * * *